March 26, 1940.    H. G. LUSTFIELD ET AL    2,195,315
DOLL'S EYE
Filed Aug. 16, 1939
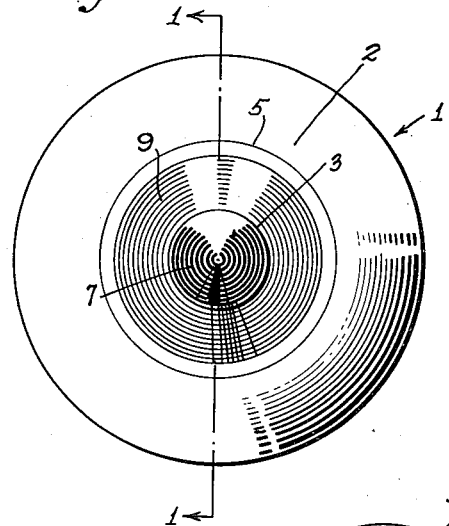
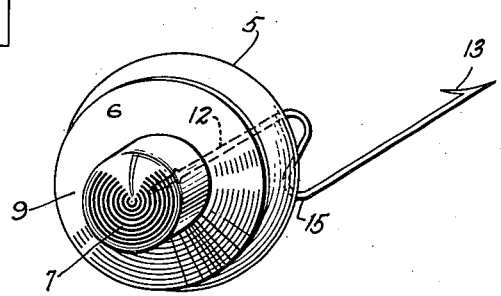
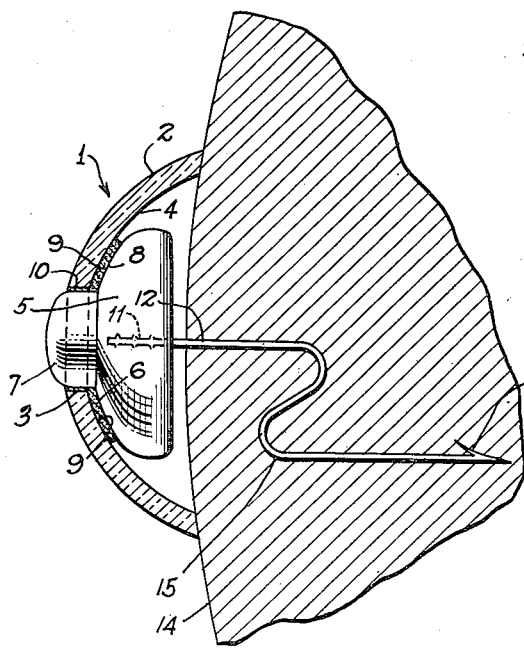
Fig. 2
Fig. 3
Fig. 1
INVENTORS,
*Herman G. Lustfield,*
BY  *Frances E. Lustfield,*
*Benjamin Roman.*
ATTORNEY.

Patented Mar. 26, 1940

2,195,315

UNITED STATES PATENT OFFICE 2,195,315

DOLL'S EYE

Herman G. Lustfield and Frances E. Lustfield, Brooklyn, N. Y.

Application August 16, 1939, Serial No. 290,338

7 Claims. (Cl. 46—170)

This invention relates to eye representing devices for dolls of human or animal forms. In the making of dolls it is aimed to simulate the eyes closely to natural eyes, and to emphasize the appearance and expression of the eyes, so that in the manufacture of dolls of animal forms it is often desired to have the eyes appear luminous in darkness or semi-darkness, in order to make the doll more attractive and enhance its resemblance to the natural animal.

In the making of such luminous eyes, however, it is necessary to resort to luminescent paints or mediums, such as radium paints, and since children often tend to destroy their dolls, by gouging out the eyes, in the course of which they may bring an eye in contact with the mouth, there arises serious danger of poisoning or poisonous injury under such circumstances.

The principal object of the invention is to remedy the above mentioned serious disadvantage, and to provide a doll's eye which will be simple, conveniently and economically manufacturable, convenient for assemblage with the doll, salable at low cost, reliable, efficient, safe, improved, and furthermore impart an appearance and expression of a natural with improved emphasis both in light or dark conditions.

Other objects and advantages will hereinafter appear.

In the accompanying drawing—

Fig. 1 is a cross-sectional elevation of the eye constituting the invention, taken on the line 1—1 of Fig. 2.

Fig. 2 is a front elevation showing the eye as it appears when fronting the face of the doll.

Fig. 3 is a perspective view, showing a detail of the eye.

The eye 1 includes an oblate shell 2 having a central circular opening 3, which shell is preferably made of any suitable plastic material, such as "lucite" or "luminite," and is semi-transparent and tinted to conform with the natural color of the eye-ball of a particular creature which it represents. At the rear of shell 2 and behind its concave surface 4 is located a nipple-shaped element 5 comprising a disk part 6 and tit part 7, which element is likewise made of suitable plastic material, but is opaque and of black color. The upper contour 8 of part 6 parallels the curvature of concave surface 4 of shell 2, and the part 7 protrudes through the hole 3 of said shell and peers out therefrom to represent the pupil of the eye. Between contour 8 of disk 6 and the concave surface 4 of shell 2 adjacent thereto is located a layer 9 intended to represent the iris of the eye, which layer is circular, of a color design conforming to the eye of the creature represented, and consists of an admixture of any suitable cementitious material, luminescent paint, as radium paint, and bitter substance, as quinine. The cementitious constituent of said admixture serves to cement or secure the element 5 to the shell 2 and incidentally as a vehicle for the quinine and luminescent paint, the latter provides the luminosity for the iris in dark situations, while the quinine supplies the bitter substance to the admixture and renders it repellant in case the child contacts therewith and brings the material or contacted hand to its mouth, as will be hereinafter seen.

The element 5 is preferably further secured to the shell 2 by means of a layer 10 of transparent glue being lodged between the wall of hole 3 and the tit 7, as shown in Fig. 1. In the disk 6 is molded the terminal 11 of a pin 12, which projects therefrom, is of serpentine configuration, and provided with a pronged point 13, as illustrated in Figs. 1, 3, by means of which pin the eye 1 may be secured to the stuffed doll face 14, by being pierced through and inserted in said face in the set manner shown, whereby the loop 15 of the pin 12 locks the latter to prevent withdrawal or accidental removal of the eye from the doll.

Should the child undertake to destroy the doll equipped with this eye and thereby remove the latter, and should it furthermore effect a separation of the element 5 from the shell 2, the admixture composing the circular iris layer 9 is such that it will disintegrate upon separation of these two parts. But should the child possibly chance to contact with said admixture and bring it to its mouth its bitter constituent will repel it from the same and thereby assure the child against poisoning dangers. As normally the luminescent paint material is at all times out of reach of the infant, the latter is at all times safe from contacting therewith, and it will be evident that this doll's eye is in every other manner organized and equipped to carry out all of the above described advantages of the invention.

Variations may be resorted to within the scope of the invention, and portions of the improvements may be used without others.

Having thus described our invention, we claim:

1. A doll's eye having the combination of an oblate shell of semi-transparent material to represent the eye-ball, said shell having a central opening, an element penetrating said opening to represent the pupil, having an enlarged part conforming to the contour of said shell, a layer of material consisting of an admixture of cementitious substance, luminescent paint, and bitter substance being located between said shell and said element to represent the iris and to secure said shell to said element, and means to secure the eye to the doll.

2. A doll's eye having the combination of an oblate shell of semi-transparent material to represent the eye-ball, said shell having a central opening, an element penetrating said opening to represent the pupil, having an enlarged part conforming to the contour of said shell, a layer of material consisting of an admixture of cementitious substance, luminescent paint, and bitter substance being located between said shell and said element to represent the iris and to secure said shell to said element, and a serpentine pin secured to said element and extending from the eye being insertible into the material of the doll face to secure the eye to the doll.

3. A doll's eye having the combination of an oblate shell of semi-transparent material to represent the eye-ball, said shell having a central opening, an element penetrating said opening to represent the pupil, having an enlarged part conforming to the contour of said shell, a layer of material being located between said shell and said element to represent the iris and to secure said shell to said element, and means to secure the eye to the doll.

4. A doll's eye having the combination of an oblate shell of semi-transparent material to represent the eye-ball, said shell having a central opening, and an element penetrating said opening to represent the pupil, having an enlarged part conforming to the contour of said shell.

5. A doll's eye having the combination of an oblate shell of semi-transparent material to represent the eye-ball, said shell having a central opening, an element penetrating said opening to represent the pupil, having an enlarged part conforming to the contour of said shell, and a layer of material consisting of an admixture of luminescent paint and bitter substance being located between said shell and said element to represent the iris and to secure said shell to said element.

6. A doll's eye having the combination of an oblate shell of semi-transparent material to represent the eye-ball, said shell having a central opening, an element penetrating said opening to represent the pupil, having an enlarged part conforming to the contour of said shell, and a layer material being located behind said shell to represent the iris.

7. A doll's eye having the combination of an oblate shell of semi-transparent material to represent the eye-ball, said shell having a central opening, an element penetrating said opening to represent the pupil, having an enlarged part conforming to the contour of said shell, and a layer of material consisting of an admixture of cementitious substance, luminescent paint, and bitter substance being located between said shell and said element to represent the iris and to secure said shell to said element.

HERMAN G. LUSTFIELD.
FRANCES E. LUSTFIELD.